(12) United States Patent
Wu

(10) Patent No.: US 11,423,149 B2
(45) Date of Patent: Aug. 23, 2022

(54) METHOD AND COMPUTER APPARATUS SECURELY EXECUTING EXTENSIBLE FIRMWARE APPLICATION

(71) Applicant: INSYDE SOFTWARE CORP., Taipei (TW)

(72) Inventor: Wen-Chin Wu, Taipei (TW)

(73) Assignee: INSYDE SOFTWARE CORP., Taipei (TW)

( * ) Notice: Subject to any disclaimer, the term of this patent is extended or adjusted under 35 U.S.C. 154(b) by 169 days.

(21) Appl. No.: 16/987,408

(22) Filed: Aug. 7, 2020

(65) Prior Publication Data

US 2021/0103661 A1 Apr. 8, 2021

(30) Foreign Application Priority Data

Oct. 7, 2019 (TW) .................................. 108136224

(51) Int. Cl.
*G06F 9/445* (2018.01)
*G06F 21/57* (2013.01)
*H04L 9/32* (2006.01)

(52) U.S. Cl.
CPC ............ *G06F 21/572* (2013.01); *G06F 9/445* (2013.01); *H04L 9/3247* (2013.01); *H04L 9/3263* (2013.01); *G06F 2221/033* (2013.01)

(58) Field of Classification Search
CPC .. G06F 21/572; G06F 9/445; G06F 2221/033; H04L 9/3247; H04L 9/3263
See application file for complete search history.

(56) References Cited

U.S. PATENT DOCUMENTS

| 6,782,350 | B1 * | 8/2004 | Burnley | G06F 11/3089 |
| | | | | 714/E11.2 |
| 2011/0091039 | A1 * | 4/2011 | Spitz | G06F 21/33 |
| | | | | 709/229 |
| 2014/0281577 | A1 * | 9/2014 | Nicholes | G06F 21/85 |
| | | | | 713/189 |
| 2014/0365755 | A1 * | 12/2014 | Liu | G06F 21/572 |
| | | | | 713/2 |
| 2015/0154031 | A1 * | 6/2015 | Lewis | G06F 21/575 |
| | | | | 713/2 |

(Continued)

FOREIGN PATENT DOCUMENTS

TW I617914 B 3/2018

*Primary Examiner* — Aurel Prifti

(57) ABSTRACT

A method securely executing an extensible firmware application is performed by a computer apparatus. The computer apparatus includes a firmware volume and a boot loader. The firmware volume includes a firmware application module to be executed, has passed a security check, and is attached with a secure encryption signature. The boot loader is attached with a first valid digital signature, and is verifiable by a secure boot certificate signature database of the computer apparatus. When the firmware application module is executed, the boot loader or the secure boot certificate signature database of the computer apparatus first verifies a secure encryption signature of the firmware volume, and the boot loader then loads the firmware application module to a buffer memory for further reading and execution, such that execution of the firmware application module is allowed and is executed securely in a secure boot mode under supervision of the boot loader.

10 Claims, 6 Drawing Sheets

(56) References Cited

U.S. PATENT DOCUMENTS

| | | | | |
|---|---|---|---|---|
| 2016/0087801 A1* | 3/2016 | Jones | .................... | G06F 21/575 |
| | | | | 713/176 |
| 2017/0098084 A1* | 4/2017 | Kulkarni | ................ | G06F 9/4401 |
| 2017/0308705 A1* | 10/2017 | Karaginides | ............ | G06F 8/654 |
| 2019/0042754 A1* | 2/2019 | Jreij | ....................... | G06F 21/575 |
| 2019/0286351 A1* | 9/2019 | Ho | ........................ | G06F 3/0656 |
| 2020/0089889 A1* | 3/2020 | Kim | ....................... | G06F 21/575 |
| 2020/0250314 A1* | 8/2020 | Vidyadhara | ........... | G06F 9/4411 |
| 2020/0310824 A1* | 10/2020 | Atta | ....................... | H04L 9/3247 |

* cited by examiner

METHOD AND COMPUTER APPARATUS SECURELY EXECUTING EXTENSIBLE FIRMWARE APPLICATION

CROSS-REFERENCE TO RELATED APPLICATION

This non-provisional application claims priority under 35 U.S.C. § 119(a) on Patent Application No(s). 108136224 filed in Taiwan, R.O.C. on Oct. 7, 2019, the entire contents of which are hereby incorporated by reference.

BACKGROUND OF THE INVENTION

1. Field of the Invention

The present invention relates to a method and a computer apparatus executing an application, and more particularly to a method and a computer apparatus securely executing an extensible firmware application.

2. Description of the Related Art

Secure boot is one of the boot mechanisms for computer apparatus applications in the recent years, and is executed in a Unified Extensible Firmware Interface (UEFI) environment to ensure that firmware modules loaded in a boot phase of the computer apparatus, such as a boot firmware, a firmware driver, a firmware application and the loaded operating system, is verified by a secure boot certificate, so as to prevent the computer apparatus from loading untrusted firmware module or operating system of unknown sources, thereby ensuring security of the computer apparatus.

In a secure boot mode, when a computer apparatus is powered on and booted, a signature database containing secure boot certificates verifies whether the loaded firmware is attached with a valid digital signature corresponding to a secure boot certificate. Only when the valid digital signature attached to the firmware is successfully verified, loading of the firmware is allowed. The secure boot certificate signature database is built and updated by an original equipment manufacturer (OEM). In order to obtain a valid digital signature, the boot loader, firmware driver, firmware application and operating system first need to be submitted to the OEM for a security check, and execution thereof is authorized after successfully passing the check; that is, a valid digital signature corresponding to a secure boot certificate is attached to the firmware or operating system.

However, for reasons of some functions of a firmware application, even if the firmware application has obtained the valid digital signature, a security issue can still be resulted after the firmware application is loaded to a computer apparatus. For example, a code interpreter (e.g., a Python interpreter) is capable of assisting in the execution of codes or programs loaded thereby, and even if the security of the code interpreter is successfully verified, the execution of the code interpreter may still jeopardize the security of the computer apparatus when the loaded codes or program files contain malicious functions. Similarly, due to over-powerful functions of a firmware application, it is in general difficult to successfully pass the security check and obtain the valid digital signature. Thus, when a computer apparatus is in a secure boot mode, the code interpreter cannot be loaded nor executed, resulting in complications for engineering staff.

BRIEF SUMMARY OF THE INVENTION

To achieve at least the above objective, the present disclosure provides a method securely executing an extensible firmware application, the method being performed by a computer apparatus. The computer apparatus includes a firmware volume (FV) and a boot loader. The firmware volume includes a firmware application module to be executed, has passed a security check, and is attached with a secure encryption signature by a secure encryption procedure. The boot loader is verified by a secure boot certificate signature database of the computer apparatus. In an embodiment, the method of the present invention includes the following steps: when the firmware application module is to be executed, verifying the secure encryption signature of the firmware volume; the boot loader loading the firmware application module to a buffer memory when the secure encryption signature is successfully verified; and the boot loader reading and executing the firmware application module in the buffer memory.

In one embodiment, the boot loader is signed and authorized by a secure boot certificate signature database of an OEM and is thus a boot loader attached with a first valid digital signature, and is for performing the method securely executing a firmware application of the present invention. The firmware application module, which is to be executed and not yet authorized, is stored in a firmware volume. The firmware application module further includes, in addition to a main program to be executed, non-application files such as execution files, data files and coding files needed by the main program. The content of the firmware volume needs to first pass a security check, and the firmware volume is encrypted for protection and attached with a secure encryption signature after the content of the firmware volume has passed the security check. To execute the firmware application module in the firmware volume, given that the firmware volume is verified by verifying the secure encryption signature, the firmware application module in the firmware volume is considered as having sufficient security, and thus the firmware application module is loaded to a buffer memory, and the firmware application module is further identified and read from the buffer memory and executed.

That is to say, the security of the firmware volume is that, a security check is performed in advance on the main application and the needed non-application file and a secure encryption signature is added, so as to obtain guarantee and trust. When the application module is to be loaded, the secure encryption signature of the firmware volume needs to be first verified, the firmware application module is loaded by the boot loader from the firmware volume to the buffer memory after having been successfully verified, and is further read and executed by the boot loader. As such, the overall security of the main application and other non-application files needed for execution in the firmware application module is ensured, preventing the security of the computer apparatus from being jeopardized by being loaded untrusted non-application files during the actual execution of the main application. Therefore, execution of the firmware application module is allowed in a secure boot mode in a UEFI environment of a current computer apparatus, eliminating inconveniences of being unable to execute, in a secure boot mode, a firmware application that is not authorized by a secure boot certificate signature database.

The present invention further provides a computer apparatus securely executing an extensible firmware application. In one embodiment, the computer apparatus includes a secure boot certificate signature database, a boot loader, a firmware volume and a buffer memory. The boot loader includes a first valid digital signature, and the first valid digital signature is verifiable by the secure boot certificate signature database. The firmware volume stores a firmware application module, and has passed a security check in advance and is attached by a secure encryption signature by a secure encryption procedure. When the computer apparatus in a secure boot mode is to execute the firmware application module, the secure encryption signature in the firmware volume is verified by the boot loader. Once the secure encryption signature is successfully verified, the boot loader loads the firmware application module in the firmware volume to the buffer memory, and the firmware application module is further read from the buffer memory and executed by the boot loader.

In one embodiment, the first valid digital signature included in the boot loader allows the boot loader to be successfully verified by the secure boot certificate signature database in the secure boot mode of the computer apparatus. The boot loader further verifies the secure encryption signature in the firmware volume, and once the verification is successful, loads the firmware application module in the firmware volume to the buffer memory for reading and execution. The security of the boot loader has been verified, and the boot loader is in charge of verifying the secure encryption signature of the firmware volume, such that the firmware application module is executed under supervision of the boot loader to ensure the security thereof during execution. Therefore, execution of the firmware application module is allowed in a secure boot mode in a UEFI environment of a current computer apparatus, eliminating inconveniences of being unable to execute, in a secure boot mode, a firmware application that is not authorized by a secure boot certificate signature database.

The present invention further provides a computer apparatus securely executing an extensible firmware application. Different form the first type of computer apparatus above, the firmware volume is merged with the boot loader. Thus, when the computer apparatus in a secure boot mode is to execute the firmware application module, the boot loader and the first valid digital signature are verified by the secure boot certificate signature database. Once the first valid digital signature is successfully verified, the boot loader loads the firmware application module in the firmware volume to the buffer memory, and further reads from the buffer memory and executes the firmware application module. Similarly, execution security of the firmware application module is ensured by executing the firmware application module by the boot loader. Therefore, execution of the firmware application module is allowed in a secure boot mode in a UEFI environment of a current computer apparatus, eliminating inconveniences of being unable to execute, in a secure boot mode, a firmware application that is not authorized by a secure boot certificate signature database.

In one embodiment, the boot loader and the firmware volume are together verified by the secure boot certificate signature database, hence together ensuring the security of the boot loader and the firmware volume. Once the verification is successful, the boot loader similarly loads, reads and executes the firmware application module in the firmware volume, thereby guaranteeing the security of the firmware volume when the firmware application module is executed.

DETAILED DESCRIPTION OF THE INVENTION

To facilitate understanding of the object, characteristics and effects of this present disclosure, embodiments together with the attached drawings for the detailed description of the present disclosure are provided.

Figure 1:
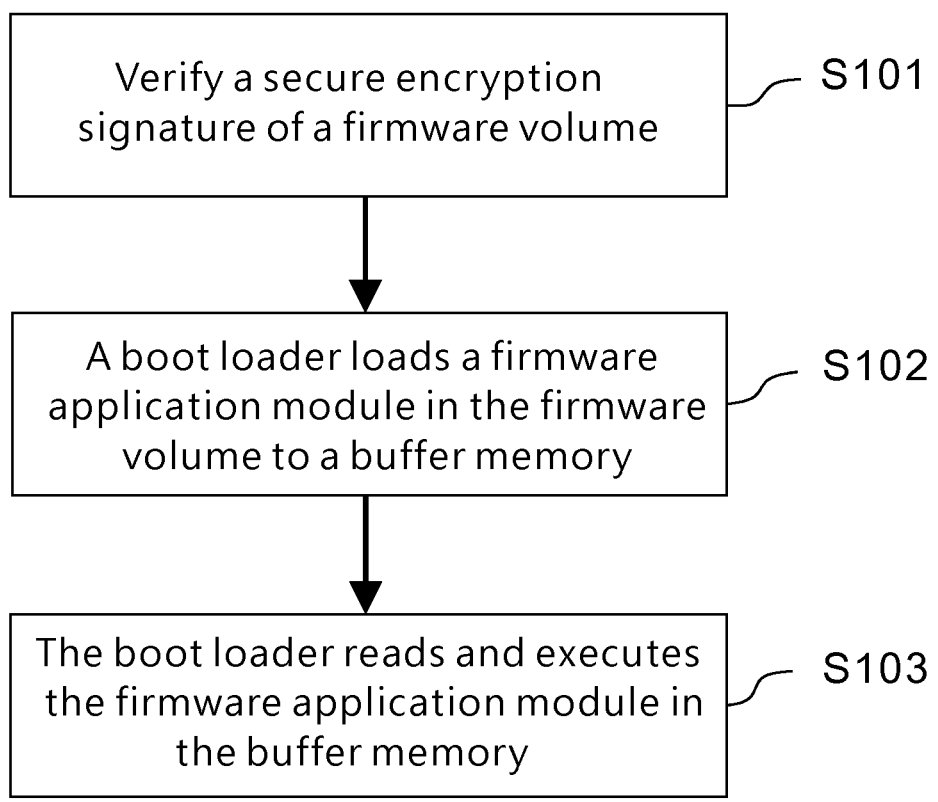
FIG. 1 is a flowchart of a method securely executing an extensible firmware application of the present invention.

Referring to FIG. 1, the present invention provides a method securely executing an extensible firmware application, and the method is performed by a computer apparatus. The computer apparatus includes a firmware volume (FV) and a boot loader. The firmware volume includes a firmware application module to be executed, has passed a security check, and is attached with a secure encryption signature by a secure encryption procedure. A first valid digital signature attached in the boot loader is verified by a secure boot certificate signature database of the computer apparatus. The method of the present invention includes the following steps: when the firmware application module is to be executed, verify the secure encryption signature of the firmware volume (S101); the boot loader loads the firmware application module to a buffer memory when the secure encryption signature is successfully verified (S102); and the boot loader reads and executes the firmware application module in the buffer memory (S103).

Figure 2:
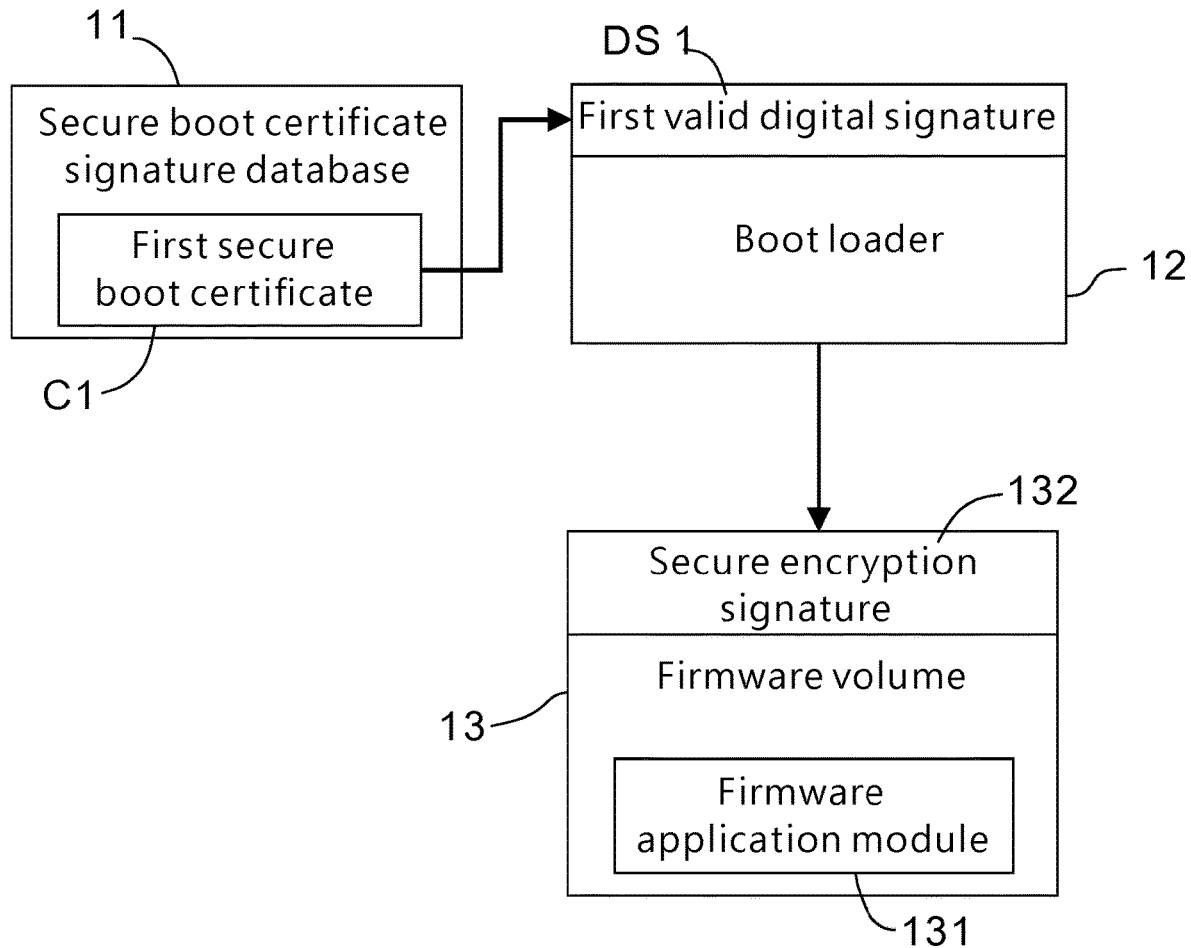
FIG. 2 is a block diagram of a computer apparatus securely executing an extensible firmware application of the present invention.
Figure 3:
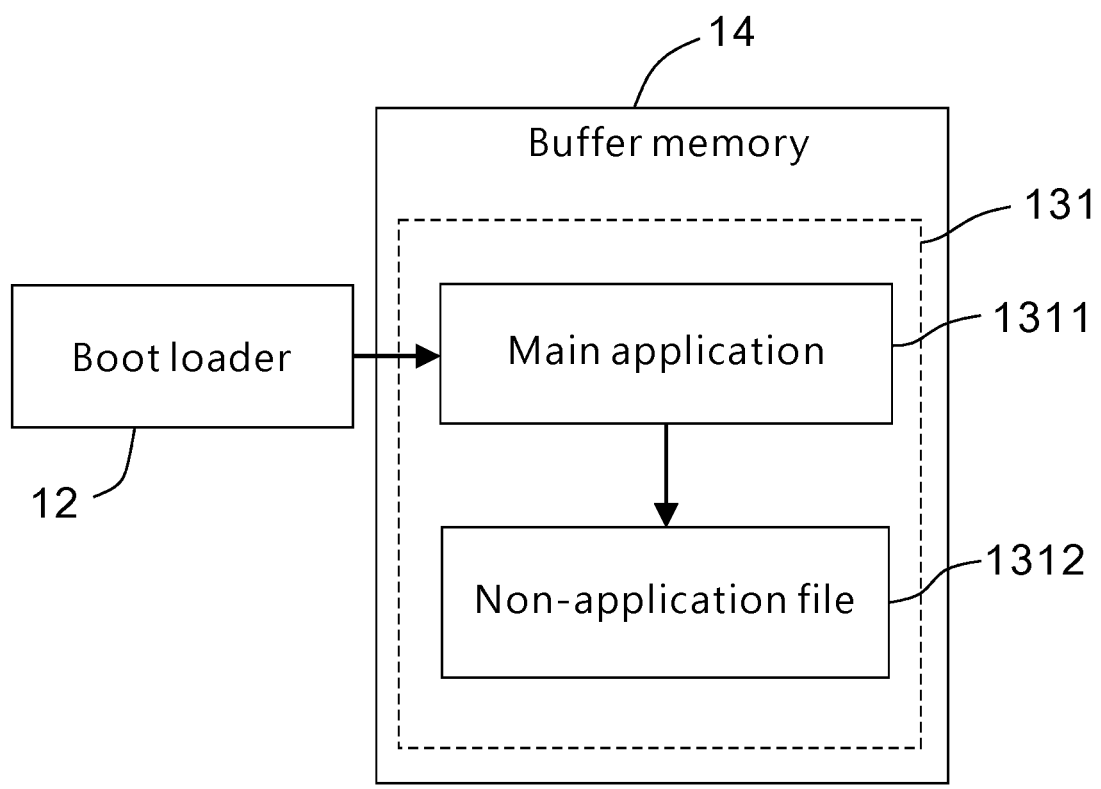
FIG. 3 is a block diagram of a computer apparatus securely executing an extensible firmware application in a state of application of the present invention.

Referring to FIG. 2 and FIG. 3, a computer apparatus for performing the method includes a secure boot certificate signature database 11, a boot loader 12, a firmware volume 13 and a buffer memory 14. The boot loader 12 includes a first valid digital signature DS1, and the first valid digital signature DS1 is verifiable by the secure boot certificate signature database 11. That is to say, the secure boot certificate signature database 11 includes a first secure boot certificate C1 corresponding to the first valid digital signature DS1. The firmware volume 13 has a firmware application module 131 to be executed stored therein, and the firmware volume 13 has first passed a security check and is attached with a secure encryption signature 132 by a secure encryption procedure.

As shown in FIG. 2, when the computer apparatus in a secure boot mode is to execute the firmware application module 131, the secure encryption signature 132 in the firmware volume 13 is first verified. Once the secure encryption signature 132 is successfully verified, as shown in FIG. 3, the boot loader 12 loads the firmware application module 131 in the firmware volume 13 to the buffer memory 14, and the boot loader 12 further reads from the buffer memory 14 and executes the firmware application module 131.

The firmware application module 131 at least includes a main application 1311 to be executed. The main application 1311 has not been verified by the secure boot certificate signature database 11 of the computer apparatus, and thus does not carry a valid digital signature corresponding to the secure boot certificate in the secure boot certificate signature database 11. Once the main application 1311 in the firmware volume 13 passes a security check and is attached with a secure encryption signature 132, the security of the main application 1311 in the firmware volume 13 can be ensured by verifying the secure encryption signature 132 in the firmware volume 13. Further, the firmware application module 131 further includes, in addition to the main application 1311, any non-application file 1312 needed for the execution of the main application 1311, for example, an execution file, a data file or a coding file. That is to say, when the firmware volume 13 receives the security check, the non-application file 1312 needed for the execution of the main application 1311 also receives the security check, so as to ensure the overall security of the firmware application module 131. Further, once the secure encryption signature 132 in the firmware volume 13 is successfully verified, the boot loader 12 loads the main application 1311 in the firmware volume 13 to the buffer memory 14 and executes the main application 1311. While the main application 1311 is being executed, the non-application file 1312 that needs to be executed together is read from an address of the buffer memory 14 designated by the boot loader 12 and loaded.

As such, by security guarantee of the secure encryption signature 132 and ensuring the address of the non-application file 1312 by the boot loader 12, it is guaranteed that the execution of the main application 1311 does not jeopardize the computer apparatus as a result of loading malicious information in an untrusted non-application file, and such execution is allowed by the secure boot mechanism of the computer apparatus.

Preferably, after the main application and the non-application file are loaded to the buffer memory, the buffer memory 14 is read-only protected, so as to ensure that the main application 1311 or the non-application file 1312 is not further tampered after being loaded to the buffer memory 14.

Means for verifying the secure encryption signature 132 in the firmware volume 13 is different according to the security check method and execution source of the firmware volume 13. An example is given below for further illustration.

Figure 4:
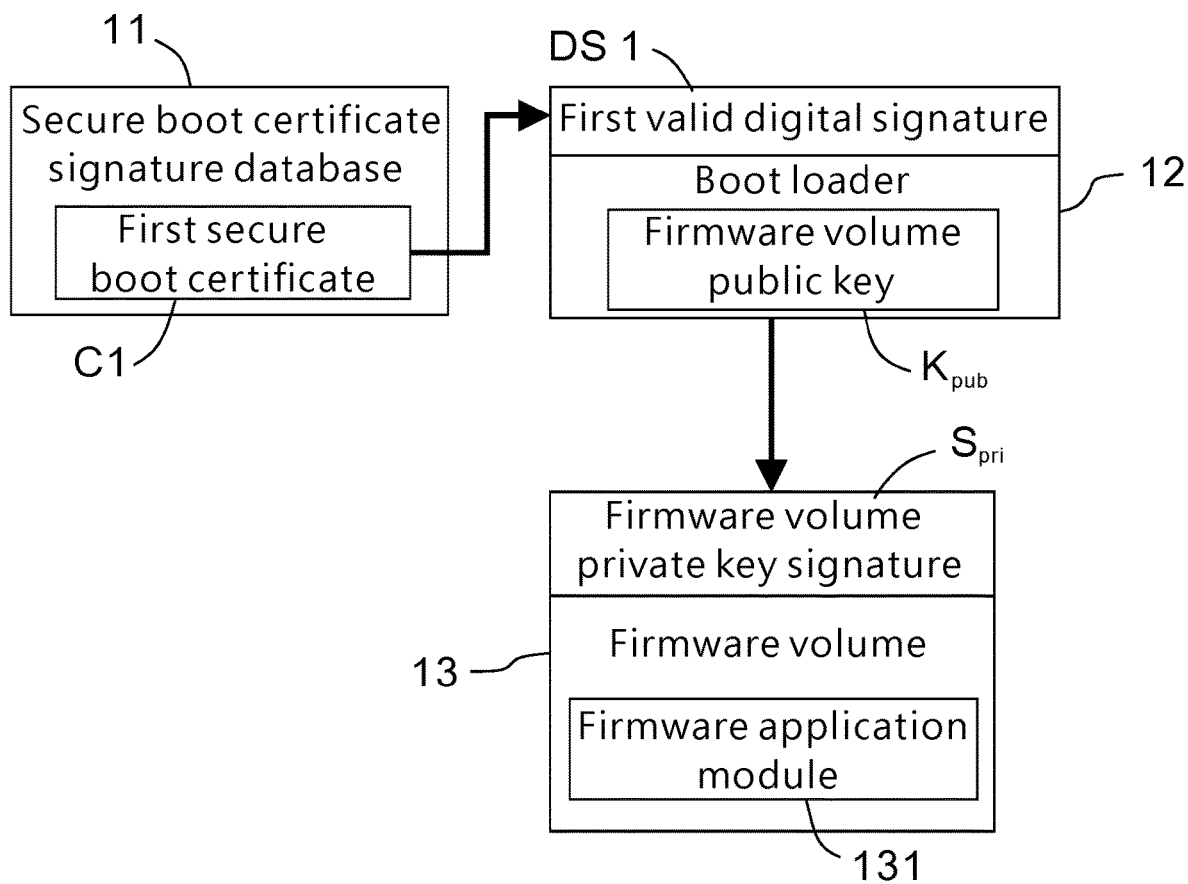
FIG. 4 is a block diagram of a computer apparatus securely executing an extensible firmware application according to a first preferred embodiment of the present invention.

Referring to FIG. 4, in a first preferred embodiment, in step S101 of verifying the secure encryption signature of the firmware volume 13, a firmware volume private key signature $S_{pri}$ included in the firmware volume 13 is verified by a firmware volume public key $K_{pub}$. That is to say, the firmware volume 13 has a firmware volume private key signature $S_{pri}$, the firmware volume public key $K_{pub}$ is carried by the boot loader 12, and the boot loader 12 first verifies the firmware volume private key signature $S_{pri}$ by the firmware volume public key $K_{pub}$ when the firmware application module 131 is to be executed.

In this preferred embodiment, the security check of the firmware volume 13 is performed in advance by the computer apparatus, or performed by a third-party computer apparatus. Once the firmware volume 13 passes the security check, a secure encryption procedure is performed by means of a firmware volume private key so as to form the firmware volume private key signature $S_{pri}$. A firmware volume public key $K_{pub}$ corresponding to the firmware volume private key is carried by the boot loader 12. When the firmware application 131 is to be executed, the boot loader 12 verifies the firmware volume private key signature $S_{pri}$ of the firmware volume 13 by using the firmware volume public key $K_{pub}$. As such, the boot loader 12 can confirm the security of the firmware application module 131 in the firmware volume 13, and further load and execute the main application 1311 and the required non-application file 1312 in the firmware application module 131. In this preferred embodiment, preferably, the firmware volume 13 performs the secure encryption procedure by the hash algorithm X509 or SHA 256 hash algorithm.

Figure 5:
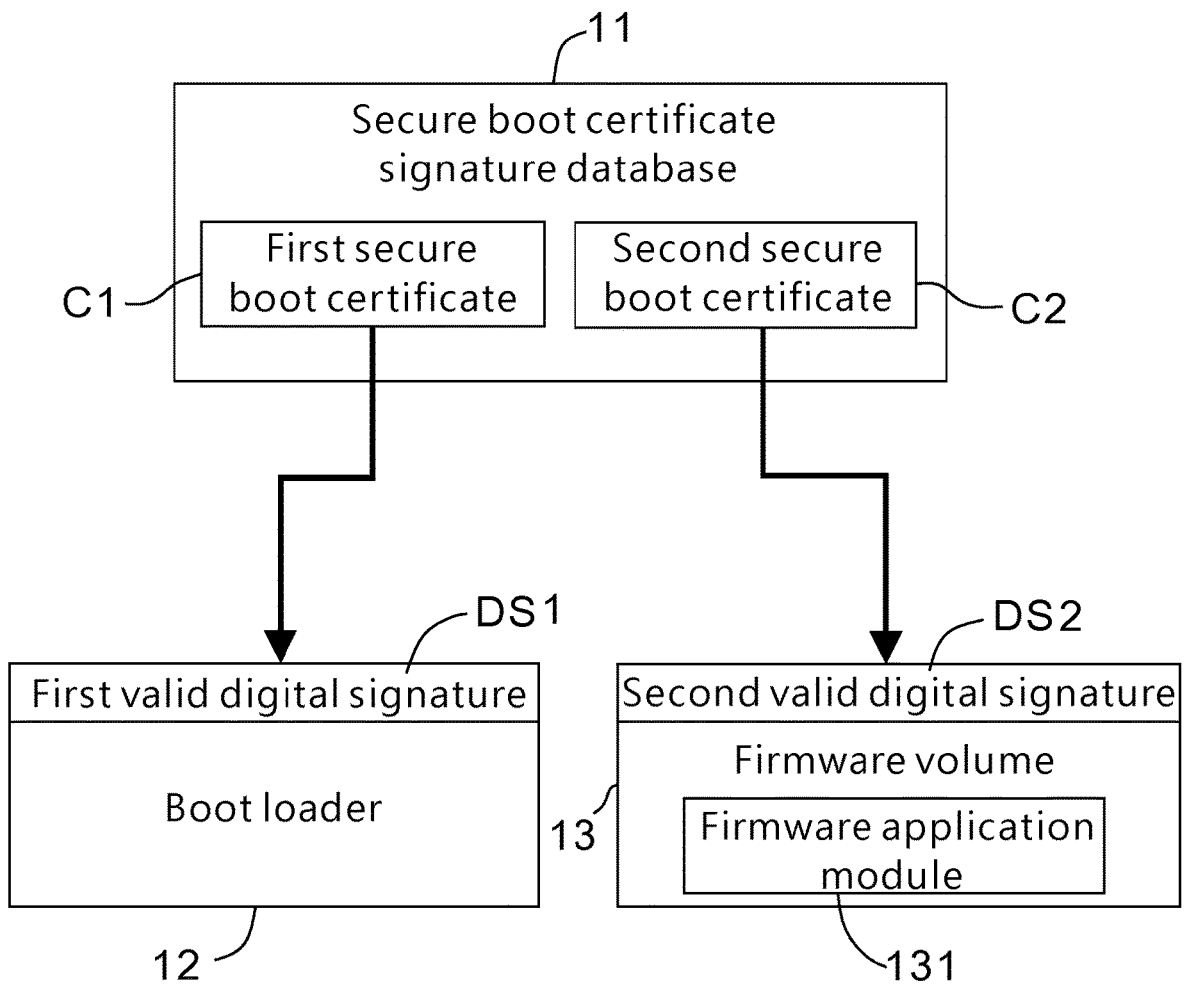
FIG. 5 is a block diagram of a computer apparatus securely executing an extensible firmware application according to a second preferred embodiment of the present invention.

Referring to FIG. 5, in a second preferred embodiment, the secure boot certificate signature database 11 of the computer apparatus is required to verify a second valid digital signature DS2 carried by the firmware application module 131. That is to say, in this embodiment, the security check of the firmware volume 13 is performed by a signer tool corresponding to the secure boot certificate signature database 11, and once the firmware volume 13 passes the security check of the signer tool, an encryption private key corresponding to a second secure boot certificate C2 in the secure boot certificate signature database 11 is used for secure encryption to form the second valid digital signature DS2. When the boot loader 12 is to load the firmware volume 13, the second secure boot certificate C2 is used as a decryption public key corresponding to the encryption private key to verify the second valid digital signature DS2. Similarly, once the verification and decryption are completed, the boot loader 12 loads the firmware application module 131 to the buffer memory 14.

In this preferred embodiment, the security check of the firmware volume 13 is similarly performed by a signer tool corresponding to the secure boot certificate signature database 11 of the computer apparatus. Since the firmware application module 131 includes the main application 1311 and the non-application file 1312 needed for the execution, all programs and loaded information in the main application 1311 of the firmware application module 131 can all be confirmed in the security check. Thus, the firmware volume 13 can pass the security check of the signer tool and be attached with the second valid digital signature DS2.

Figure 6:
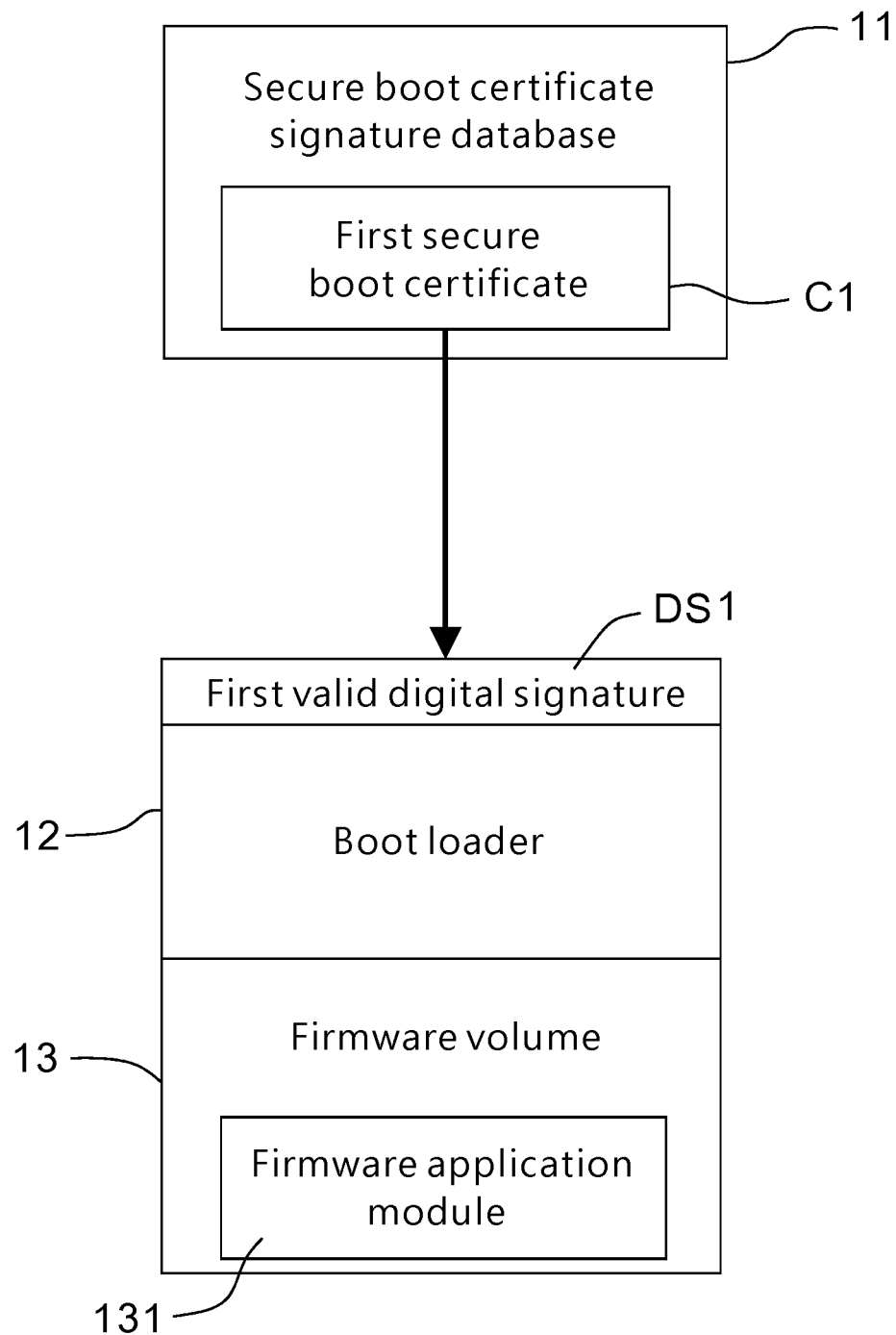
FIG. 6 is a block diagram of a computer apparatus securely executing an extensible firmware application according to a third preferred embodiment of the present invention.

Referring to FIG. 6, in a third preferred embodiment, the firmware volume 13 is merged with the boot loader 12. That is to say, when the boot loader 12 receives a signing procedure of the secure boot certificate and is attached with the first valid digital signature DS1, the signer tool of the secure boot certificate and the firmware volume 13 perform signing of the secure boot certificate. Thus, once the first valid digital signature DS1 of the boot loader 12 and the firmware volume 13 is successfully verified by the secure boot certificate signature database 11, the security of the firmware volume 13 is together confirmed, and the boot loader 12 then loads the firmware application module 131 in the firmware volume 13 to the buffer memory 14 for further execution.

While the present disclosure has been described by means of specific embodiments, numerous modifications and variations could be made thereto by those skilled in the art without departing from the scope and spirit of the present disclosure set forth in the claims.

What is claimed is:

1. A method securely executing an extensible firmware application, the method being performed by a computer apparatus, the computer apparatus comprising a firmware volume and a boot loader; wherein the firmware volume comprises a firmware application module to be executed, the firmware volume has passed a security check and is attached with a secure encryption signature by a secure encryption procedure, and a first valid digital signature attached to the boot loader is verified by a secure boot certificate signature database of the computer apparatus; the method executing an extensible firmware application comprising:

verifying the secure encryption signature of the firmware volume when the firmware application module is to be executed;

the boot loader loading the firmware application module to a buffer memory when the secure encryption signature is successfully verified; and the boot loader reading and executing the firmware application module in the buffer memory, wherein the firmware application module comprises a main application and a non-application file; once the secure encryption signature of the firmware volume is successfully verified, the boot loader loads the main application and the non-application file to the buffer memory; when the boot loader executes the firmware application module, the main application reads from an address of the buffer memory designated by the boot loader and executes the non-application file.

2. The method securely executing an extensible firmware application according to claim 1, wherein in the step of verifying the secure encryption signature of the firmware volume, the boot loader verifies a firmware volume private key signature included in the firmware volume by a firmware volume public key.

3. The method securely executing an extensible firmware application according to claim 1, wherein in the step of verifying the secure encryption signature of the firmware volume, the boot loader requests the secure boot certificate signature database to verify the firmware volume, and the firmware volume has been signed by a second valid digital signature.

4. The method securely executing an extensible firmware application according to claim 1, wherein the firmware volume is merged with the boot loader; when the boot loader performs a secure boot certification signing procedure so as to attach the first valid digital signature, the secure boot certification signing procedure is performed together on the firmware volume; the step of verifying the secure encryption signature of the firmware volume is simultaneously completed when the secure boot certificate signature database verifies the first valid digital signature of the boot loader.

5. The method securely executing an extensible firmware application according to claim 1, wherein when the boot loader loads the firmware application module to the buffer memory, the buffer memory is read-only protected.

6. The method securely executing an extensible firmware application according to claim 1, wherein when the boot loader loads the firmware application module to the buffer memory, the buffer memory is read-only protected.

7. A computer apparatus securely executing an extensible firmware application, comprising:

a secure boot certificate signature database;

a boot loader, comprising a first valid digital signature, the first valid digital signature being verifiable by the secure boot certificate signature database;

a firmware volume, comprising a firmware application module, the firmware volume having passed a security check and being attached with a secure encryption signature by a secure encryption procedure; and a buffer memory;

wherein when the computer apparatus in a secure boot mode is to execute the firmware application module, the boot loader verifies the secure encryption signature of the firmware volume; once the secure encryption signature is successfully verified, the boot loader loads the firmware application module in the firmware volume to the buffer memory; and the boot loader further reads from the buffer memory and executes the firmware application module, wherein the firmware application module comprises a main application and a non-application file; once the secure encryption signature of the firmware volume is successfully verified, the boot loader loads the main application and the non-application file to the buffer memory; when the boot loader executes the firmware application module, the main application reads from an address of the buffer memory designated by the boot loader and executes the non-application file.

8. The computer apparatus securely executing an extensible firmware application according to claim 7, wherein the secure encryption signature of the firmware volume is a firmware volume private key signature formed by performing secure encryption on the firmware volume by a firmware volume private key; the boot loader comprises a firmware volume public key corresponding to the firmware volume private key; when the boot loader verifies the secure encryption signature of the firmware volume, the firmware volume private key signature is verified by the firmware volume public key.

9. The computer apparatus securely executing an extensible firmware application according to claim 7, wherein the secure encryption signature of the firmware volume is a second valid digital signature, the second valid digital signature being verifiable by the secure boot certificate signature database; when the boot loader verifies the secure encryption signature of the firmware volume, the boot loader requests the secure boot certificate signature database to verify the second valid digital signature of the firmware volume.

10. A computer apparatus securely executing an extensible firmware application, comprising:

a secure boot certificate signature database;

a boot loader, comprising a first valid digital signature, the first valid digital signature being verifiable by the secure boot certificate signature database;

a firmware volume, comprising a firmware application module, the firmware volume being merged with the boot loader;

a buffer memory;

wherein when the computer apparatus in a secure boot mode is to execute the firmware application module, the secure boot certificate signature database verifies the first valid digital signature of the boot loader and the firmware volume; once the first valid digital signature is successfully verified, the boot loader loads the firmware application module in the firmware volume to the buffer memory; and the boot loader further reads from the buffer memory and executes the firmware application module, wherein the firmware application module comprises a main application and a non-application file; once the secure encryption signature of the firmware volume is successfully verified, the boot loader loads the main application and the non-application file to the buffer memory; when the boot loader executes the firmware application module, the main application reads from an address of the buffer memory designated by the boot loader and executes the non-application file.

* * * * *